US005467700A

United States Patent [19]

Dowell et al.

[11] Patent Number: 5,467,700

[45] Date of Patent: Nov. 21, 1995

[54] DENSITY SEPARATION SHELLER FOR PEANUT GRADE SAMPLES

[75] Inventors: Floyd E. Dowell; Harry T. Sheppard; Lawrence A. Dettore, all of Albany; Clyde T. Bennett, Dawson, all of Ga.

[73] Assignee: The United States of America as represented by the Secretary of Agriculture, Washington, D.C.

[21] Appl. No.: 15,978

[22] Filed: Feb. 10, 1993

[51] Int. Cl.[6] ................................ A23N 5/01; B07B 9/02

[52] U.S. Cl. ................................ 99/570; 99/569; 99/574; 209/19

[58] Field of Search .............................. 99/568–570, 574, 99/575; 209/12, 19–21, 30, 31, 36, 37, 667, 669, 672, 673

[56] References Cited

U.S. PATENT DOCUMENTS

| | | | |
|---|---|---|---|
| 328,032 | 10/1885 | Hill | 99/570 |
| 567,372 | 9/1896 | Beach | 99/569 |
| 611,765 | 10/1898 | Beach | 99/568 |
| 613,867 | 11/1898 | Read | 99/570 |
| 853,066 | 5/1907 | Crellin | 99/569 |
| 1,157,199 | 10/1915 | Williams | 99/570 |
| 1,317,342 | 9/1919 | Williams | 99/570 |
| 1,461,265 | 7/1923 | Bullard | 209/669 |
| 1,564,914 | 12/1925 | Vaughan | 99/570 |
| 1,576,244 | 3/1926 | Nehrhood | 99/570 |
| 1,869,658 | 8/1932 | Branda | 99/570 |
| 1,975,761 | 10/1934 | Bailey | 99/570 |
| 2,220,320 | 11/1940 | Dragon | 99/570 |
| 2,319,757 | 5/1943 | Vigneau | 209/673 |
| 2,449,007 | 9/1948 | Paul | 209/19 |
| 2,548,142 | 4/1951 | Carter | 209/37 |
| 3,951,056 | 4/1976 | McGehee | 99/569 |
| 4,357,864 | 11/1982 | Salete-Garces | 99/484 |
| 4,577,552 | 3/1986 | Yamamoto et al. | 99/524 |

FOREIGN PATENT DOCUMENTS

| | | | |
|---|---|---|---|
| 976937 | 11/1982 | U.S.S.R. | 99/569 |

OTHER PUBLICATIONS

Food Industries, vol. 22, Issue 3, pp. 100–103, Mar. 1950.

James W. Dickens, "Shelling Equipment for Samples of Peanuts", Marketing Res. Rpt. No. 528, USDA–Agricultural Marketing Service–Market Quality Res. Division Mar. 1962.

James. I Davidson et al, "Some Performance Characteristics of the Standard Cast–Iron Peanut Sheller", ARS–S–129, Aug. 1976, USDA–ARS.

*Primary Examiner*—Mark Spisich

*Attorney, Agent, or Firm*—M. Howard Silverstein; John D. Fado; Gail E. Poulos

[57] ABSTRACT

A device for cleaning, shelling, and sizing nuts in a single step which includes a cleaning section, mounted in front of and in communication with a shelling section, which removes debris, small pods and loose shelled kernels using screens, separating air columns, and stepped rollers; a shelling section that shells nuts and separates the kernels from mixtures of pods, hulls, and kernels using separating air columns mounted behind and in communication with the sheller; a sizing section, mounted below and in communication with the separating air columns, which separates large and small kernels using roller sizers. A single step process performed by the device significantly reduces hand labor and time.

15 Claims, 5 Drawing Sheets

DENSITY SEPARATION SHELLER FOR PEANUT GRADE SAMPLES

BACKGROUND OF THE INVENTION

1. Field of the Invention

This invention relates to a device and process for cleaning, shelling, and sizing nuts in one step. The invention eliminates hand shelling of pods by separating out the unshelled nuts from shelled kernels based on density using vertical air column separators. The invention is modular in size and design so that it can fit in existing grading rooms to replace current cleaners, pre-sizers, shellers, and kernel sizers.

2. Description of the Prior Art

The peanut industry has identified an immediate need to improve sampling, grading, and marketing of peanuts. The United States peanuts are considered to be the highest quality of peanuts available worldwide. To continue to be the world leader, one of the areas for improvement includes the grading of farmers stock peanuts especially for removal of foreign material from the stock (U.S. Peanut Quality: An Industry Commitment. 1988—A Consensus Report of the Peanut Quality Task Force, National Peanut Council, Alexandria, Va. December, 1987). Farmers stock peanuts are picked or threshed peanuts which have not been shelled or otherwise altered and usually contain foreign material. Foreign material is everything other than peanuts in the shell found in farmers stock. This includes dirt, hay, sticks, dirt clods, stones, insects, broken shells, pieces of glass, soybeans, corn kernels, loose shelled kernels (LSKs), and "raisins or twisters". "Raisins or twisters" are extremely immature, undeveloped peanuts with badly shriveled and shrunken shells. Loose shelled kernels (LSKs) are completely free from hulls and are scattered in farmers stock. These are undesirable since kernels generally maintain quality better if they are inside of good sound hulls.

There are about 500 peanut grading rooms throughout the United States which grade about 600,000 samples of peanuts each year using a peanut grading system which has been in place since the 1960's and is judged as inaccurate, slow, and labor intensive by the National Peanut Council, the Federal State Inspection Service, the Peanut Grading Working Group, the Peanut Administration Committee, and the Southeastern Peanut Association. The system requires the almost constant attention of at least two inspectors per grading room to assist the cleaning, pod pre-sizing, shelling, and kernel sizing machines as well as to transfer the samples from one machine to the next. Furthermore, the machines used for cleaning and shelling are not complete in their operation and require inspectors to hand clean and shell portions of each sample. The entire current process from cleaning through kernel sizing requires about 20 minutes.

Devices which combine shelling and/or grading steps for nuts have been developed. The prior art machines of Dragon (U.S. Pat. No. 2,220,320), Vaughan (U.S. Pat. No. 1,564,914), Branda (U.S. Pat. No. 1,869,658), Hill (U.S. Pat. No. 328,032), McGehee (U.S. Pat. No. 3,951,056) and Bailey (U.S. Pat. No. 1,975,761) do not remove foreign material or LSKs from the stock prior to the shelling step. The machine of Nehrhood (U.S. Pat. No. 1,576,244) removes small foreign material using a mesh screen (15) but does not remove large foreign material or LSKs before shelling.

Another step prior to shelling is pre-sizing which separates the in-shell peanuts according to size making it possible for the sheller to operate more efficiently. Nehrhood ('244) and Bailey ('761) both have pre-sizing apparatus on their devices. Nehrhood's apparatus pre-sizes using a revolving drum (14) made up of screens of different mesh which can be changed to suit the size or character of the nuts being shelled. However, with indeterminate crops such as peanuts, unshelled pods may be the same diameter as large shelled kernels and the two would not be separated. Furthermore, the nuts will not be sized based on their maximum diameter since they may not orient themselves in a manner that allows them to fall through the perforated screens. The machine of Bailey ('761) uses rollers to pre-size the unshelled nuts which are then passed on to the sheller. However, the sheller also receives any LSKs and other foreign materials.

The final step after shelling is sizing of the shelled kernels. The machines of Branda ('658), Nehrhood ('244), and Hill ('032) all have mechanisms which size the shelled kernels using perforated screens which are not precise since the nuts are not always sized by their maximum diameter.

While various devices have been developed for combining the steps of processing unshelled nuts, there still remains a need in the art for a more effective device for shelling and grading nuts.

SUMMARY OF THE INVENTION

The invention comprises a device for cleaning, shelling, and grading nuts in a single step which eliminates the use of separate machines for each step of the process and reduces the time from about twenty minutes to about five minutes. Furthermore, it may reduce labor requirements by at least 25%. Currently in the peanut industry, about 2,000 inspectors are required to grade peanuts. Labor savings may be substantial since the device eliminates pre-sizing and hand shelling of unshelled pods by separating out the unshelled pods from shelled kernels based on density. Unshelled pods contain denser kernels enveloped in air and less dense hulls. This hull, kernel, and air combination results in a less dense material than the shelled kernels. Since less dense material has a lower flotation velocity than denser material, a fluid can readily be used to separate unshelled pods from shelled kernels. All pods can be placed in the largest grate of the sheller and any unshelled pods picked up by vertical density air column separators are placed in shellers with successively smaller grates. In addition, the increased accuracy of this invention, especially through the use of roller sizers for sizing the shelled kernels, addresses urgent industry requests to develop grading equipment that gives reliable, consistent results. Increasing consumer demand can not be met if quality can not be accurately measured. The invention cleans, shells, and sizes kernels in a single step. The invention utilizes a cleaning mechanism designed to remove all foreign material prior to shelling; a shelling mechanism with four shelling stages, each designed to handle progressively smaller pods which insures all pods are shelled while minimizing split kernels; and a sizing mechanism where the kernels are sized using a roller sizer which rotates the kernels in order to size by the maximum diameter of the minor axis of the kernels.

This novel device comprises a means for cleaning the farmers stock of all foreign material prior to shelling which includes a means for receiving nuts, a means for feeding the nuts over a means for removal of dirt, a means for removal of dirt, a novel density separating means for removing less dense material from more dense material, a roller means for removal of foreign material and small pods and delivery of large pods to a first stage sheller means, a means for delivering the foreign material to containers, a means for delivering small pods and loose shelled whole kernels to a density separating means, a novel density separating means for separating loose shelled whole kernels from small pods, a means for collecting the dense loose shelled kernels that fall out of the density separating means, a means for carrying the less dense small pods into an expansion chamber, and a means for delivering the small pods that settle out of the expansion chamber to a third sheller means;

- a sheller means which includes a first stage sheller means that receives large pods from the cleaning roller means, a means for delivering shelled kernels, hulls, and pods to a density separating means, a container means for collecting less dense hulls, a first stage density separating means for separating the dense kernels from the less dense pods, a means for delivering the less dense pods into an expansion chamber, a second stage sheller means for receiving less dense pods from the expansion chamber, a means for delivering kernels, hulls, and pods from the second stage sheller means into a density separating means, a container means for collecting less dense hulls from the separating means, a means for carrying the less dense pods into an expansion chamber, a third stage sheller means for receiving less dense pods from the expansion chamber, a means for delivering the hulls, shelled kernels, and small pods to a density separating means, a density separating means for separating hulls from shelled kernels and small pods, a collector means for collecting the less dense hulls from the separating means, a third stage pod density separating means for receiving the more dense kernels and pods, an expansion chamber means for receiving the less dense pods, a fourth stage sheller means for receiving the pods from the expansion chamber means, a means for delivering the hulls, shelled kernels, and unshelled pods to a density separating means, and a density separating means for separating hulls from shelled kernels and small pods;
- a sizing mechanism which includes a means for delivering the kernels that fall out of the first, second, and third stage density separating means to a feeding mechanism, a means for feeding the kernels to a sizer means, a novel sizer means for sizing the kernels by the maximum diameter of the minor axis of the kernels, and a collection means for collecting the different sized kernels.

It is an object of this invention to provide a machine for cleaning, shelling, and grading farmers stock nuts in a single step. It is a further object of the invention to provide a machine with density separating columns which remove foreign materials such as rocks and loose shelled kernels prior to shelling, and to separate hulls, pods, and kernels during the shelling stages. Still another object of the invention is to provide a machine with an improved sizing mechanism where the kernels are sized by the maximum diameter of the minor axis of the kernels. Another object of the invention is to provide a machine which recirculates unshelled pods to eliminate hand shelling. Furthermore, it is an object of the invention to provide a machine which is modular in size which allows the use of the machine in conventional grading rooms.

Other objects and advantages will become apparent from the following description.

DESCRIPTION OF THE PREFERRED EMBODIMENTS

Figure 1:
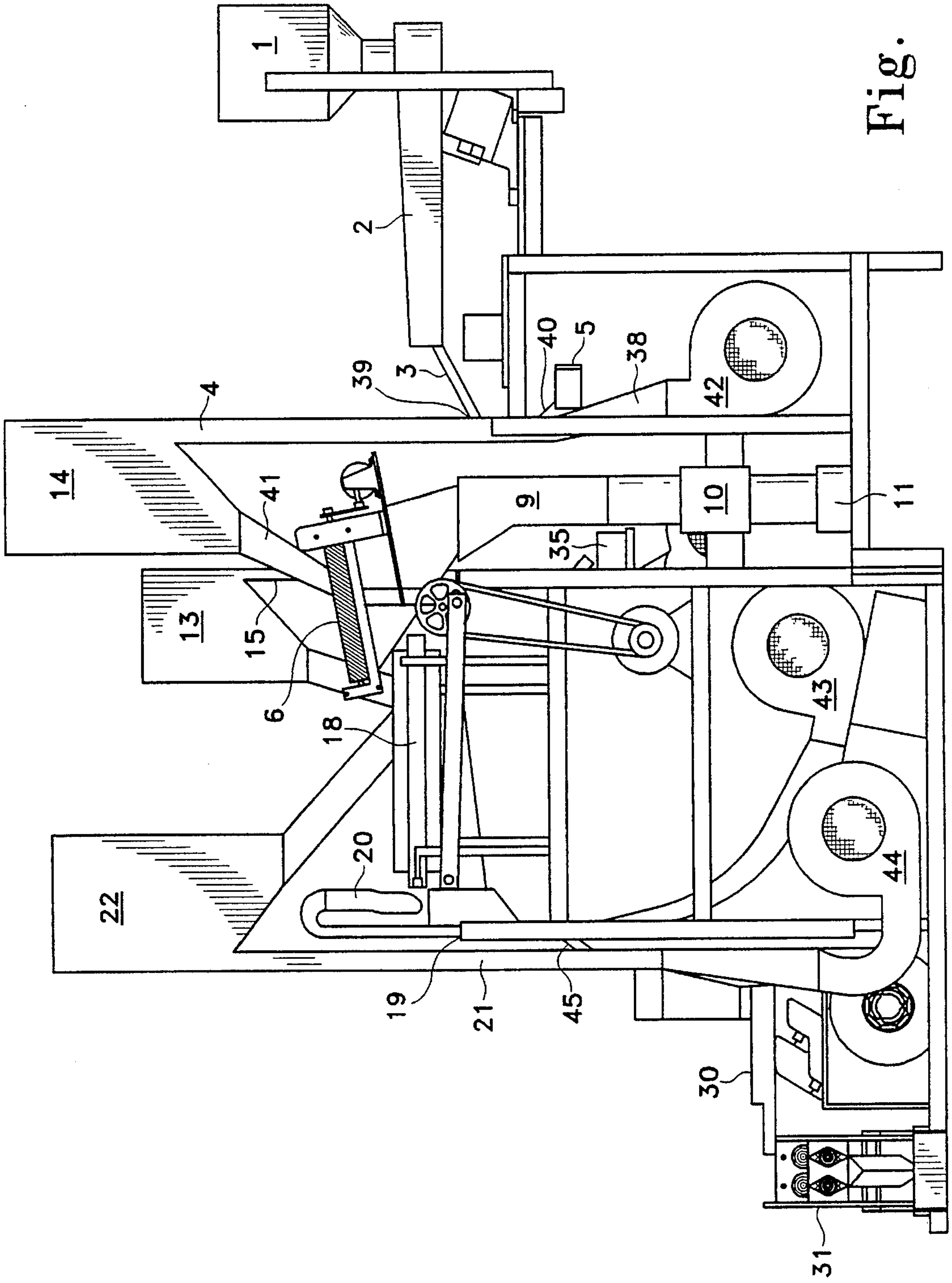
FIG. 1 is a side view of the present invention.
Figure 2:
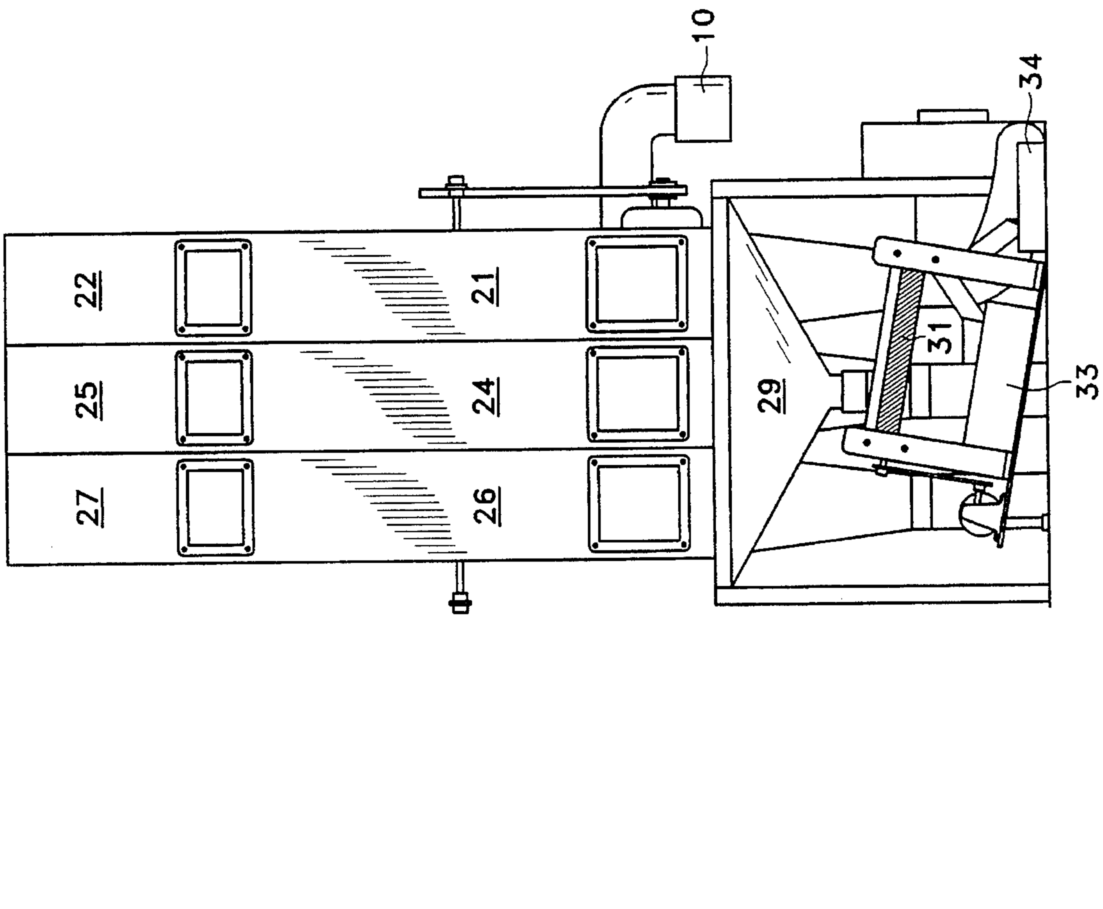
FIG. 2 is a front view of the present invention.
Figure 3:
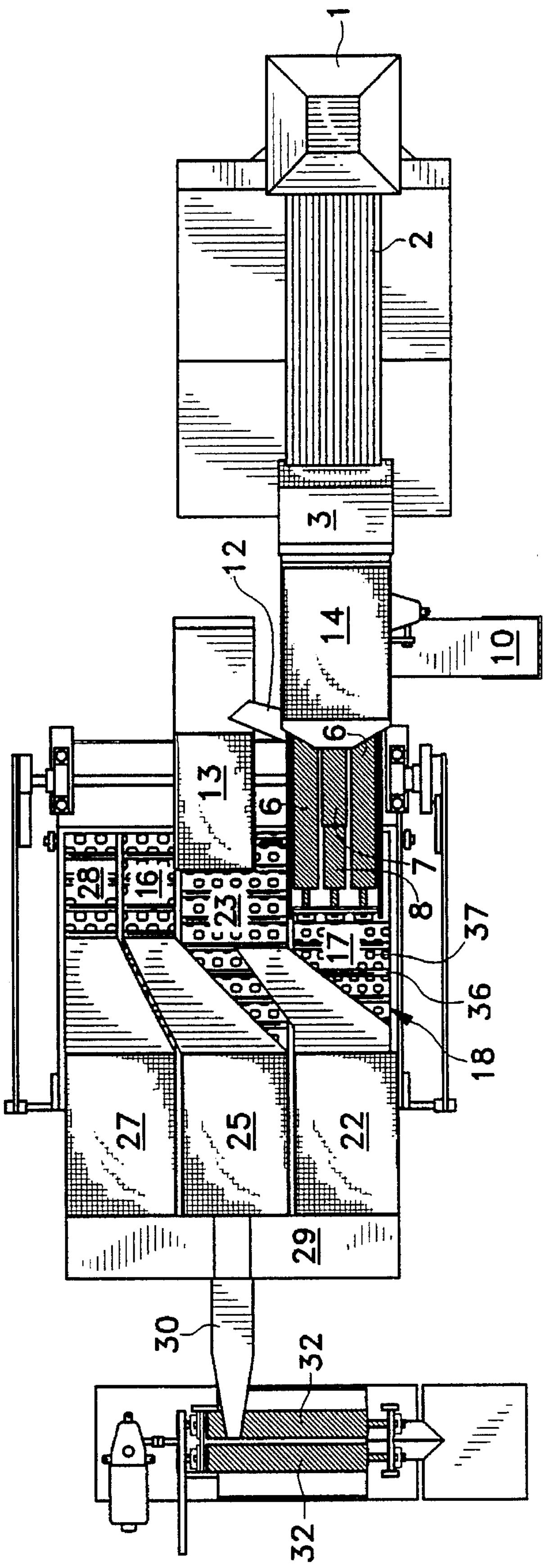
FIG. 3 is a top view of the present invention.
Figure 4A:
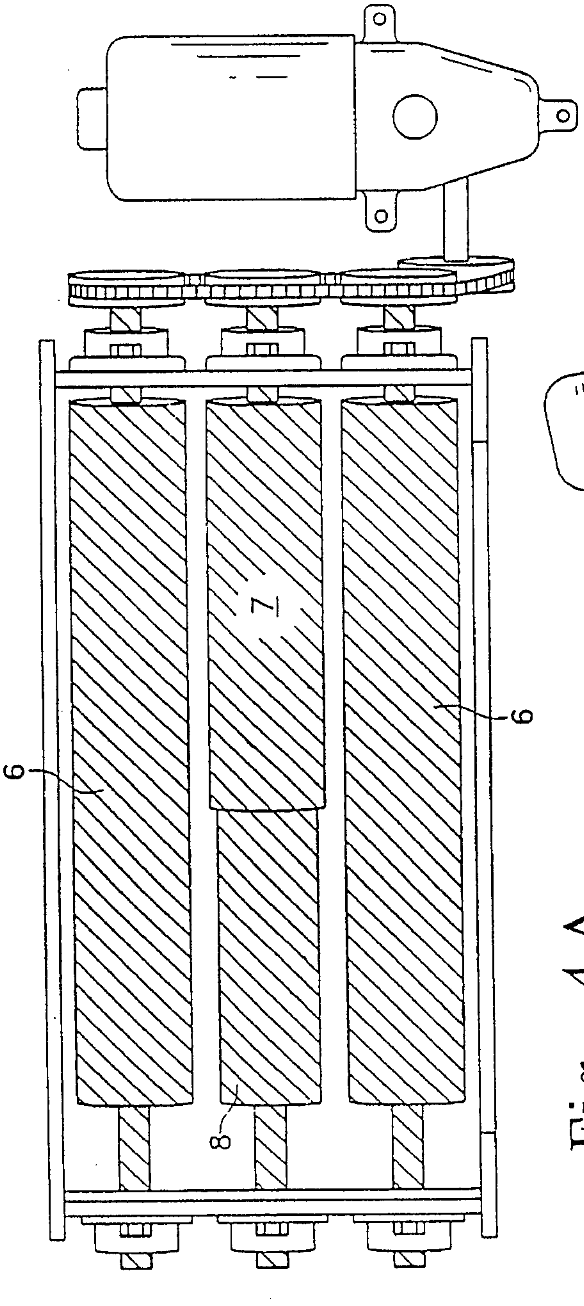
FIG. 4*a* is a top view and FIG. 4*b* is a side view of the stepped roller system.
Figure 4B:
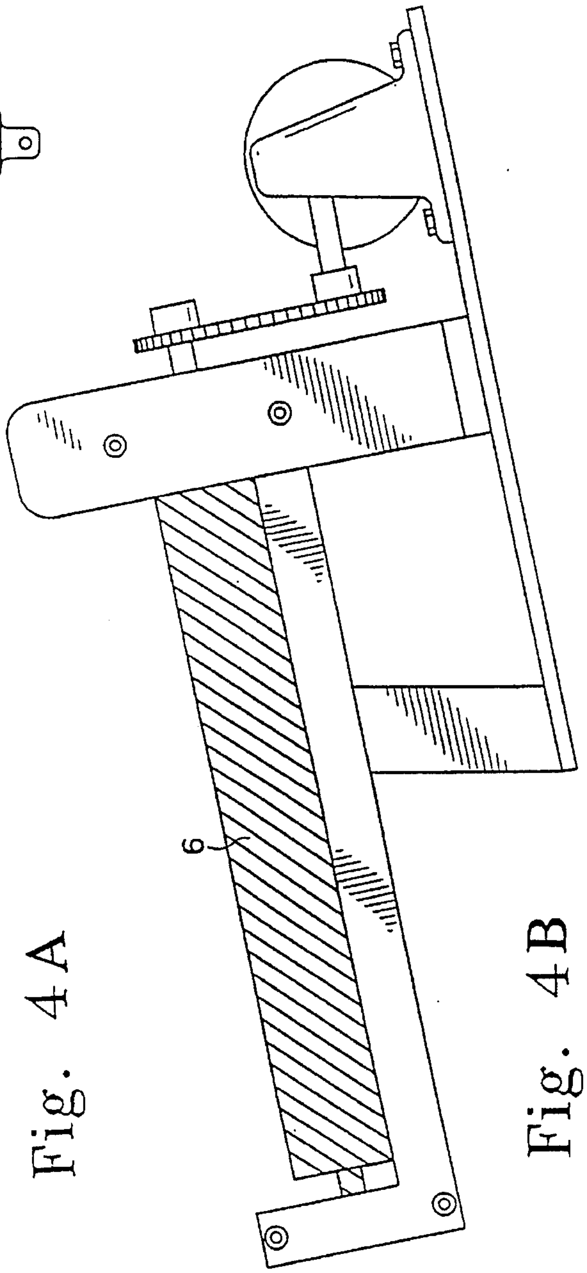
Figure 5:
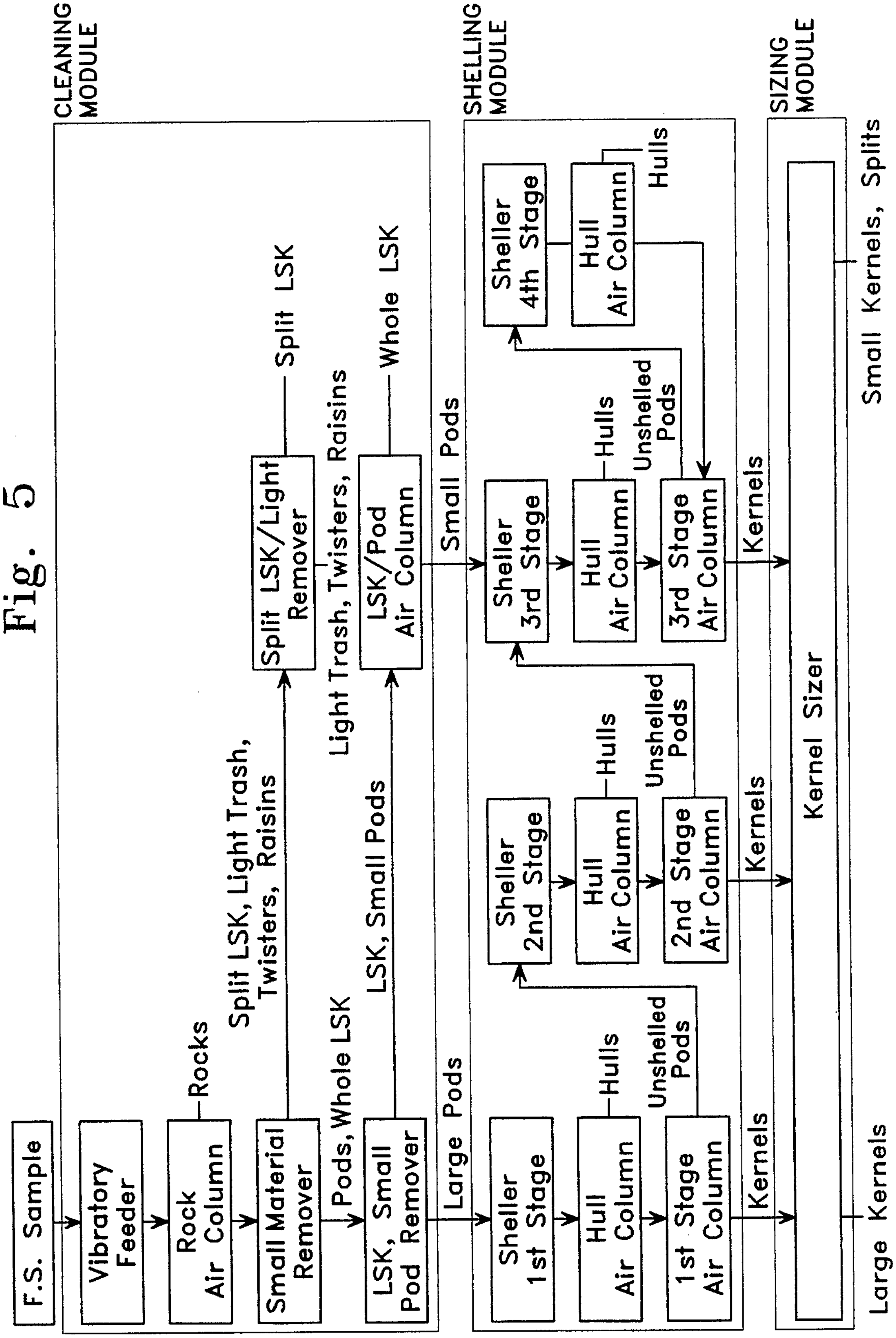
FIG. 5 is a flow chart for the shelling mechanism of the present invention.

The first aspect of the present invention, cleaning, will be discussed with reference to FIGS. 1–3. In operation, a farmers stock peanut sample, consisting of pods, kernels, and foreign material (i.e., dirt, leaves, stones, etc.) is placed in the hopper 1 (FIGS. 1 and 3). The hopper can be any device that is sufficiently large to hold a sample of approximately 4,000 grams and which has an outlet of sufficient size that allows the material to flow out of the hopper onto a vibratory trough without bridging or plugging. It can be easily fabricated from any suitable materials such as wood or metal. An elevated and slightly downwardly sloped vibratory trough 2 (FIGS. 1 and 3) vibrates the peanuts to a perforated screen 3 to remove the dirt from the nuts. Screen 3 is also sloped downward and even more so than the slope of the vibratory trough. The screen is fabricated from metal stock of any thickness by drilling approximately 0.20 inch diameter holes into the metal approximately the same distance apart as the diameter of the holes. The vibratory trough onto which the hopper feeds can be any commercially available one such as the SYNTRON electromagnetic vibrating feeder as supplied by FMC Corporation, Material Handling Equipment Division, Homer City, Pa. 15748. The sample, free of dirt, is conveyed by the downward sloped screen 3 to a rock separating vertical air column 4 located adjacent to and in communication with fan 42 (FIG. 1). Air column 4 and fan 42 separate the most dense materials of the sample, i.e., rocks, which are removed and deposited in the rock tray 5 (FIG. 1). The air columns of the invention are fabricated from about ⅛ inch sheet metal and are about 1.5 inches deep, 8.0 inches wide, and about 3 feet tall. In operation, fan 42 delivers air through a duct 38 (FIG. 1) to air column 4. Material enters the air column 4 through an opening 39 (FIG. 1) of the column. More dense material falls out of the air column through an opening 40 (FIG. 1) of column 4. Opening 39 is approximately six inches above opening 40 of column 4. A second perforated screen (not shown) which protects fan 42 from falling debris is located just below the opening 40 and allows air to travel up through the column while directing material to opening 40. The air velocity in the column 4 is set slightly higher than the flotation velocity of the less dense material such as unshelled and shelled nuts, portions of vines, other vegetation, etc. Thus, the less dense material is carried upwards while the more dense material settles out. The less dense material is carried upwards into the expansion chamber 14 (FIGS. 1 and 3). The cross sectional area of the expansion chamber 14 is larger than that of the air column, thus the air velocity is reduced to below the flotation velocity of the less dense material, causing this material to fall to chute 41 having an exit opening of the expansion chamber. The exit opening is rectangular and directs the material onto a system 6 of three elongated, angled, adjacent, and parallel rollers (FIGS. 1 and 3) whose longitudinal axes are perpendicular to the length of the opening of chute 41 (FIG. 1). The rollers, as shown, are angled at a 5° angle (downwardly sloped) away from the chute 41. The middle roller is stepped, that is, the roller has a first 7 and a second 8 diameter which divides the roller into two axial portions the lengths of which may be equal or different. The rollers are fabricated from 2 inch metal stock. The diameter of the first step 7 of the stepped roller is 0.04 inches larger in diameter than the second step 8 (FIG. 3). All three rollers rotate in the same direction. The two outside rollers are wrapped in a spiral manner with a piece of wire forming a spiral rib which acts as a screw (not shown). The first diameter portion 7 of the stepped roller (FIG. 3) drops out the sticks, trash, and loose shelled split kernels. The second portion 8 of the stepped roller drops out the small pods and loosed shelled whole kernels. The sticks, trash, and loose shelled split kernels passing through the first portion 7 of the stepped roller fall through chute 9 (FIG. 1). The light trash and sticks are blown by a fan (not shown) located opposite container 10 into container 10 (FIG. 3). The container 10 and fan are located below and to either side of the opening of chute 9 but above container 11 which is located directly beneath chute 9. The heavier trash and loose shelled split kernels fall into the container 11. The small pods and loose shelled whole kernels passing through the second diameter portion 8 of the system of rollers 6, slide down chute 12 (FIG. 3) and enter the loose shelled kernel separating vertical air column 15. In operation, a fan delivers air to column 15. The air velocity within the column is set to carry small pods up to expansion chamber 13 where the air velocity is reduced so that such small pods fall into third stage 16 of the sheller 18 (FIG. 1). The more dense loose shelled whole kernels fall out the bottom of the air column 15 into a tray 35.

A second aspect of the invention will be discussed with reference to FIGS. 1, 2, and 3. The large pods that rode over the system of rollers 6 (FIGS. 1 and 3) of the cleaning section, fall into the first stage 17 of the sheller 18. First stage 17 includes a perforated grate 37 and rubber rollers 36 located above the grate. The pods larger than the holes in the perforated grate are shelled in the first stage 17 of the sheller 18 by the rubbing action of rubber rollers 36 over the grate 37. This method of shelling using rubber rollers and perforated grates is that presently used in the current grade shellers as described by Dickens, Shelling Equipment for Samples of Peanuts, Marketing Research Report No. 528, U.S. Department of Agriculture, Agricultural Marketing Service, 1962, and incorporated herein by reference. Any other shelling mechanisms for other types of nuts or grains may be used in this invention such as Davidson et al, Some Performance Characteristics of the Standard Cast-Iron Peanut Sheller, ARS-S-129, Agricultural Research Service, United States Department of Agriculture, August, 1976; Dragon, U.S. Pat. No. 2,220,320; Vaughan, U.S. Pat. No. 1,564,914; Branda U.S. Pat. No. 1,869,658; Hill, U.S. Pat. No. 328,032; McGehee, U.S. Pat. No. 3,951,056; and Bailey, U.S. Pat. No. 1,975,761; Nehrhood, U.S. Pat. No. 1,576,244; all incorporated herein by reference. In general, the nuts flow through the rubber rollers and rest on the grate which has perforations just large enough for the shelled kernels to drop through. The grate moves back and forth while the rollers remain stationary which creates a force that breaks open the pods. During shelling, agitation caused by the moving grate forces the kernels to move down through the perforations in the grate. The sheller as discussed above has four stages 17, 23, 16, and 28, each with a different size shelling grate for shelling a certain size range of nuts. The size of the four grates used in the present invention are $^{26}/_{64}$ inch for the first stage, $^{22}/_{64}$ inch for the second stage, $^{19}/_{64}$ inch for the third stage, and $^{16}/_{64}$ inch for the last stage (FIG. 3). One skilled in the art could readily determine the size of grates needed for the type of nut to be processed. The shelled kernels, hulls, and pods having a diameter smaller than the holes in the perforated grates fall through the grates into a hull separating vertical air column 19 having at or near the base thereof a fan 43 (FIG. 1). Partitions in air column 19 (not shown) insure unshelled pods and kernels from the appropriate sheller stage flow into the respective pod separating air column. In air column 19, the air velocity is set slightly higher than the flotation velocity of the hulls which are carried into container 20, and the more dense kernels and pods fall thru a chute 45 into the first stage pod separating vertical air column 21 having at or near the base thereof fan 44. The air velocity of column 21 is set such that all of the pods are carried up column 21 to expansion chamber 22. More dense kernels fall out of the air column 21. The less dense pods are carried into the expansion chamber 22 settle out and fall into the second stage 23 of the sheller 18 (FIG. 3). The second stage 23 has smaller perforations in the sheller grate than the first stage 17. Thus, many of the smaller pods that passed through the first shelling stage 17 will be shelled out in the second stage 23. The kernels shelled during the second stage 23, the hulls, and the pods with a diameter smaller than the perforations in the grates fall through the grate and enter the hull separating air column 19. The pods and kernels then enter the second stage pod separating air column 24 where the unshelled pods from the second stage 23 are separated from the shelled kernels. The less dense pods are carried up to the expansion chamber 25 and then fall into the third stage sheller 16 (FIG. 3). This third stage 16 has smaller perforations than the previous two stages and thus shell more of the smaller pods. The hulls, shelled kernels, and small pods with a diameter smaller then the perforations in the third stage sheller grate fall through the grate and enter the hull separating air column 19 (FIG. 1). The more dense kernels and pods fall through this air column and enter the third stage pod separating air column 26. The more dense kernels fall out of the air column 21 and the less dense pods are carried up into the expansion chamber 27 where they settle out and fall into the fourth stage sheller 28 (FIG. 3). This last stage 28 has small perforations in the sheller grates and shells most of the remaining pods. The kernels, hulls, and unshelled pods fall through the grate of the fourth stage 28 and enter the hull separating air column 19 (FIG. 2). Thus, any unshelled pods remaining from the fourth shelling stage 28 are continually recirculated through the fourth shelling stage and the third shelling stage air column 26 until all remaining pods are shelled.

The final aspect of the invention will be discussed with reference to FIGS. 1–3. All the kernels falling through the pod separating air columns 21,24,26 (FIG. 2) fall through the chute 29 and collect onto the vibratory tray 30 (FIGS. 1,3) which feeds the kernel roller sizer 31 which is perpendicular to tray 30. The rollers 32 (FIG. 3) are precisely milled to insure accurate separation of large and small kernels. The rollers are 2 inch diameter hydraulic shaft stock which have been milled to a tolerance of about 0.0005 inches for roundness and about 0.001 inch per foot of run for straightness. Pullies, connected to drive shafts and one or more motors, not shown, on the end of the roller cause the rollers to rotate. The rollers 32 rotate in the same direction which causes the kernels to roll about the axis parallel to their line of movement as they move down the rollers 32. This insures that the maximum diameter of the minor axis of the kernels determines which kernels fall through and which kernels ride over the rollers 32. The kernels smaller than the gap in the rollers fall into bin 33 (FIG. 1) whereas the kernels that ride over the rollers fall into bin 34 thus grading the kernels.

The foregoing detailed description is for the purpose of illustration. Such detail is solely for that purpose and those skilled in the art can make variations therein without departing from the spirit and scope of the invention which is defined by the claims.

INDEX OF APPARATUS ELEMENTS DESIGNATED BY A NUMERAL

1. Hopper
2. Vibratory trough
3. Perforated screen
4. Rock separating air column
5. Rock tray
6. System of rollers including a stepped roller
7. First portion of the stepped rollers
8. Second portion of stepped rollers
9. Chute for foreign material
10. Light trash and sticks container
11. Heavy trash and LSKs container
12. Chute for small pods and whole LSKs
13. Expansion chamber for the loose shelled kernel separating air column
14. Expansion chamber for the rock separating air column
15. Loose shelled kernel separating air column
16. Third stage of sheller
17. First stage of sheller
18. Sheller
19. Hull separating air column
20. Container for hulls
21. First stage pod separating air column
22. Expansion chamber for the first stage pod separating air column
23. Second stage of sheller
24. Second stage pod separating air column
25. Expansion chamber for second stage pod separating air column
26. Third stage pod separating air column
27. Expansion chamber for third stage pod separating air column
28. Fourth stage of sheller
29. Chute for kernels falling from pod separating air columns
30. Vibratory tray
31. Roller sizer
32. Rollers
33. Small kernel bin
34. Large kernel bin
35. Tray for loose shelled whole kernels
36. Rubber rollers for sheller
37. Sheller grates
38. Fan duct
39. Air column opening for material to enter
40. Air column opening for dense material to exit
41. Chute
42. Fan in conjunction with duct 38
43. Fan in conjunction with 19
44. Fan in conjunction with 21
45. Chute for pods from hull separating air column

What is claimed is:

1. An apparatus for cleaning, shelling and sizing farmers stock nuts which includes pods, whole loose kernels, loose shelled kernels, loose shelled split kernels and foreign material that includes dirt, rocks, trash, sticks, vines, and leaves, comprising a means for cleaning the farmers stock nuts; said means for cleaning includes (a) a first density separating means for removing the rocks from said farmers stock;

(b) a first roller means operatively connected to said first density separating means for separating the pods and whole loose shelled kernels from the sticks, trash, and loose shelled split kernels exiting from said first density separating means;

(c) a second density separating means operatively connected to said first roller means for separating the pods from said loose shelled kernels exiting from said first roller means;

(d) a first feeding means for moving the pods from said roller means to a downstream portion of the apparatus;

a sheller means operatively connected to said first feeding means for shelling the pods to obtain kernels;

a second feeding means for transporting the kernels exiting from said sheller means to a further downstream portion of the appartus; and a sizing means operatively connected to said second feeding means for grading the kernels exiting from said sheller means.

2. The apparatus of claim 1 wherein the sheller means comprises a first stage sheller, a first stage hull air column, and a first stage density separation column;

a second stage sheller, a second stage hull air column, and a second stage density separation column;

a third stage sheller, a third stage hull air column, and a third stage density separation column; and a fourth stage sheller and a fourth stage hull air column, wherein the four stages are operatively connected to each other such that the pods are sequentially processed by the first through the fourth stage sheller.

3. The apparatus of claim 1 wherein the sizing means includes a second roller means comprising rollers spaced apart a predetermined distance for sizing kernels obtained from said sheller means by the maximum diameter of the kernel's minor axis.

4. The apparatus of claim 3 wherein said rollers are milled to a tolerance of about 0.0005 inches for roundness and about 0.001 inches per foot of run for straightness.

5. The apparatus of claim 1 wherein said means for cleaning further comprises a receiving means for said farmers stock, a third feeding means for transporting said stock from said receiving means, a perforated screen operatively connected to said third feeding means for removal of the dirt from said transported farmers stock before it enters said first density separating means.

6. The apparatus of claim 5 wherein said receiving means is a hopper and said feeding means is a vibratory trough.

7. The apparatus of claim 1 wherein said first roller means includes a system of rollers wherein one roller is stepped.

8. The apparatus of claim 7 wherein said stepped roller includes a first step and a second step.

9. The apparatus of claim 8 wherein said first step has about a 0.04 inch larger diameter than said second step.

10. An apparatus for cleaning, shelling, and sizing farmers stock nuts which includes pods, whole loose kernels, loose shelled kernels and foreign material that includes dirt, rocks, trash, sticks, vines, and leaves, said apparatus comprising a means for cleaning the farmers stock, said means for cleaning separates out the pods from the remaining components of the farmers stock;

a means for shelling the pods operatively connected to said cleaning means, said shelling means including (a) a plurality of sheller stages for shelling the pods received from said cleaning means, (b) a plurality of density separating columns for separating pods from kernels, each of said columns is in communication with a respective one of said sheller stages, (c) a plurality of expansion chambers, each of said chambers disposed on top of a respective one of said density separating columns, (d) a first feeding means associated with each of said expansion chambers for feeding unshelled pods from each of said expansion chambers into its respective one of said plurality of sheller stages, the pods being sequentially processed by associated groups of single sheller stages, density separating columns and expansion chambers, and (e) a second feeding means operatively connected to said shelling means for moving kernels from said sheller means to a downstream portion of the apparatus; and a sizing means operatively connected to said second feeding means for grading kernels fed from said sheller means.

11. The apparatus of claim 10 wherein said sizing means includes a roller means comprising rollers spaced apart a predetermined distance which sizes said kernels by the maximum diameter of their minor axis.

12. The apparatus of claim 11 wherein said rollers are milled to a tolerance of about 0.0005 inches for roundness and about 0.001 inches per foot of run for straightness.

13. An apparatus for cleaning, shelling, and sizing farmers stock nuts which include pods, whole loose kernels, loose shelled kernels, loose shelled split kernels and foreign material that includes dirt, rocks, trash, sticks, vines, and leaves, said apparatus comprising a means for cleaning the farmers stock nuts, said cleaning means separating the pods from the remaining components of the farmers stock;

a first feeding means operatively connected to said cleaning means for removing pods from said cleaning means and feeding them to a downstream portion of the apparatus;

a sheller means for operatively connected to said first feeding means for shelling said pods received from said feeding means to obtain kernels;

a second feeding means operatively connected to said sheller means for removing said kernels from said sheller means and feeding them to a further downstream portion of the apparatus; and a sizing means operatively connected to said second feeding means including rollers spaced apart a predetermined distance for sizing kernels from said second feeding means by the maximum diameter of their minor axis.

14. The apparatus of claim 13 wherein said rollers are milled to a tolerance of about 0.0005 inches for roundness and about 0.001 inches per foot of run for straightness.

15. An apparatus for cleaning, presizing, shelling, and sizing farmers stock nuts which include pods, whole loose kernels, loose shelled kernels, loose shelled split kernels and foreign material that includes dirt, rocks, trash, sticks, vines, and leaves, said apparatus comprising a hopper for receiving said farmers stock;

a vibratory trough operatively connected to said hopper;

a perforated screen operatively connected to said trough for removing the dirt;

a first density separating means operatively connected to said screen for removing the rocks from said farmers stock fed from said hopper by said trough;

a first roller means operatively connected to the first density separating means for separating small pods from large pods as well as whole loose shelled kernels from the sticks, trash and loose shelled split kernels received from said first density separating means, a second density separating means operatively connected to the first roller means for separating small pods from whole loose shelled kernels received from said first roller means;

a first feeding means operatively connected to the second density separating means for moving pods from said second density separating means to a downstream portion of the apparatus;

a plurality of sheller stages operatively connected to said first feeding means;

a plurality of hull air columns each operatively connected to a respective one of said sheller stages which receive pods, hulls, and kernels from said sheller stages;

a plurality of air columns each operatively connected to a respective one of said hull air columns which receive unshelled pods and kernels from said hull air columns;

a plurality of expansion chambers each operatively connected to a respective one of said air columns disposed on top of a respective one of said plurality of air columns for receiving said pods;

a second feeding means for moving pods from said plurality of expansion chambers to its associated sheller stage;

a third feeding means for moving kernels from said sheller stages;

a sizing means operatively connected to said third feeding means for sizing kernels from said third feeding means wherein said sizing means includes rollers which are spaced apart a predetermined distance to size the kernels by the maximum diameter of their minor axis and said rollers are milled to a tolerance of about 0.0005 inches for roundness and about 0.001 inches per foot of run for straightness.

* * * * *